Nov. 7, 1967  W. S. FIELDER ET AL  3,351,445
METHOD OF MAKING A BATTERY PLATE
Original Filed Aug. 7, 1963

INVENTORS
JOHN M. DIEHL
NORMAN A. RAUTIOLA
WILLIAM S. FIEDLER
BY
ATTORNEY

United States Patent Office 3,351,445
Patented Nov. 7, 1967

3,351,445
METHOD OF MAKING A BATTERY PLATE
William S. Fielder, Madison, Wis. (3453 La Salle St., Racine, Wis. 53402); Norman A. Rautiola, Dallas, Tex. (1000 Browns Lake, Jackson, Mich. 49203); and John M. Diehl, 5729 Elder Place, Madison, Wis. 53705
Original application Aug. 7, 1963, Ser. No. 300,451. Divided and this application May 18, 1966, Ser. No. 574,838
1 Claim. (Cl. 65—3)

ABSTRACT OF THE DISCLOSURE

A battery plate is made by coating freshly drawn siliceous fibers with lead or a lead alloy then combining masses of these fibers into sheets with small particles of the same or a similar metal and then heating and pressing the sheets.

---

This application is a division of application Ser. No. 300,451, filed Aug. 7, 1963.

This invention relates to a novel battery plate, and more particularly to a novel battery grid and plate structure, for a lead-acid type secondary battery, the grid and plate structure having fibers embedded or dispersed therein.

This application has subject matter in common with the application entitled, Radiation Shielding Fabric, Ser. No. 87,078, filed Feb. 6, 1961, and with U.S. patent application Ser. No. 496,228, filed Mar. 23, 1955, and issued on Feb. 7, 1961, as U.S. Letters Patent 2,971,095, entitled, Radiation Shielding Fabric.

It is an object of the invention to provide a battery plate which has improved resistance to weight loss and which has greatly improved strength, structural integrity, and functionality.

It is another object to provide such a battery plate of improved electrical and mechanical parameters which is a composite structure of fibers in a ductile metallic matrix, and preferably metallic sheets or metal powder, or both, with fibers.

Another object is a method for providing such an improved battery plate by depositing, reacting thereupon, or otherwise coating vitreous fibers with metal and then applying heat and pressure to effect bonding of such fibers, preferably together with sheets or powder, or both, of the coating metal, so as to provide an integrally sound structure of adequate strength.

Other objects will become apparent from the drawings and from the following detailed description in which it is intended to illustrate the applicability of the invention without thereby limiting its scope to less than that of all equivalents which will be apparent to one skilled in the art. In the drawings the like reference numerals refer to like parts, and:

Figure 1:
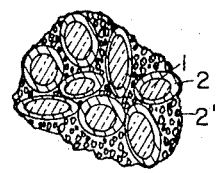
FIGURE 1 is a fragmentary cross-sectional view of one step in the process of providing a plate of the instant invention.

Embraced within the inventive concept disclosed herein, and a part hereof, is an improved lead-acid storage battery plate having as a support a lead alloy grid structure into which is spread a pastelike material which has been prepared, either in situ or previously prepared and then pasted in the grid structure of the battery plate, by mixing an appropriate lead oxide or a blend of oxides with a dilute solution of sulfuric acid to form a basic lead sulfate mixture with lead sulfates, and a cementlike mass.

The process of pasting this lead sulfate mixture into the grid structure is well known in the battery art, as is the method preparing the lead sulfate, although care must be exercised when the lead sulfate mixture is produced in situ so that the heat created may be liberated so as not to produce harmful effects to the battery grid structure and so that the lead sulfate is not allowed to expand the paste unduly, to thereby possibly cause shedding of the active material within the grid structure. It is further recognized that alternately, too little expansion of the so prepared paste material reduces porosity and limits therefore the battery ampere-hour capacity.

The positive plate in a lead-acid storage battery is subject, during the course of its operation, to a degrading action that manifests itself in gradual erosion and eventual physical and electrical failure of the plate. Shorting of the battery plate is often caused by such degradation processes. While there is erosion also taking place within and at the negative battery plate, and the invention relates to both positive and negative plates and other like battery components, this negative plate erosion is less pronounced and therefore of less concern.

Losses in the integrity of the battery plate structure inhibits the grid function of maintaining a uniform current distribution throughout the mass of active material supported within the grid structure and often leads to premature failures. Physical or structural changes in the grid structure, due to erosion, also prevent the grid from functioning as a support for the battery active materials and also adversely affect the current carrying function of the battery plate.

Not only does the present invention provide greater grid and plate serviceability and functionality, it also provides for less inherent plate electrical resistance by making possible the manufacture of battery plate tabs or lugs that are integral with the plates themselves and thereby provide electrical continuity. Furthermore, the electrical conductivity of the fibers themselves can be varied over a wide range through composition control thereof, and by varying the density of the plate structure, the electrical resistivity thereof, to thereby extend the utility of the instant invention into other parts of the electrical arts as well as into acoustics, catalysts, chemistry, and others.

Many premature battery failures, especially in batteries subject to rough handling or employed in vehicles operating under or in severe environmental conditions, occur due to separation of the tap or lug from the grid structure. The instant novel battery plate integral structure, as one embodiment of the invention, provides a solution to this type of failure and provides for a battery plate and tab structure of high strength which results from the synergistic interactivity of the fibrous reinforcement with the specific type of alloy coating and the filler material, and makes possible a more economic method of manufacture for such a superior battery plate assembly. Since the vitreous fibers may extend throughout the grid structure and into the tap, the entire integral structure is electrically and functionally improved. The specific design of the grid or the tap, or both, is not part of the instant invention and may be varied widely according to specific requirements of individual batteries, and well accepted art practice.

The instant invention can be applied to increasing the service life and utility of unpasted Plante plates, and other such cell versions well known in the battery industry. The invention might also be extended and employed to fuel cell electrodes and to extend their functionality and utility, especially at elevated service temperatures and under severe environments such as shock, vibration, gravity changes, and radiation from high energy particles and space conditions. So too, this invention may be extended, without departing from the inventive concept herein, to primary cell electrodes and assemblies and parts thereof, as well as to other such energy conversion systems and their case structures and materials and container assemblies and parts. It can be appreciated that the specific embodiments described herein are intended to be merely illustrative of the general principles of the invention, and various other modifications may be devised without departing from the spirit and scope of the invention.

In accordance with the preferred embodiment of the invention we draw vitreous siliceous fiber from a bushing or other molten mass of glass or vitreous silica and then coat the fibers with lead or lead alloy. Both of these operations may be performed in any suitable manner, for example, in any of the various manners described in the art, such as vapor phase decomposition and deposition, spraying, use of electrostatic fields, use of a nonuniform field with nonconducting fluid mediums, and others well defined and well known in the art. In a preferred embodiment, the step of putting the metal coating on the fibers is accomplished by passing the fibers through or against a meniscus of molten metal, the metal being maintained in a molten pool. The fibers are then laid or otherwise formed into a mat or other shape in any suitably desired manner. The fibers may be oriented randomly or the axes of all of one group of fibers may be substantially parallel or one layer of fibers may be provided with the axes of the fibers in the layer extending substantially in one direction. The next layer may be provided with fiber axes extending parallel to one another in the same layer but at an angle to those in the previous layer and if desired additional layers may be provided with the fiber axes in each layer substantially parallel but all of the axes in each layer being substantially at an angle to the axes of fibers in adjacent layers. Metal particles having substantially the same composition as the coating metal are introduced into the interstices between the fibers. The temperature of the resultant mass is raised to 150° C. and a pressure of 500 p.s.i. is then applied for a period of from 3 to 8 minutes. Preferably the application of the pressure is accomplished by placing the heated mass between heated press platens or insulated press platens so that the mass is not substantially changed in temperature while it is subjected to pressure and then closing the press with the mass of fibers between the platens until the desired pressure is provided. The resultant sheet may be used as a lead plate in a secondary battery or a large sheet may be appropriately stamped or otherwise cut into the desired grid and tab assemblies and structures for subsequent introduction of the active lead sulfate materials therein, and is found to be superior for this purpose.

Further understanding of the novelty inherent in the instant invention can be secured by considering the effect of the fibers is to absorb part of the load to which the battery plate assembly is subjected and in direct proportion to the integrated cross-sectional area of the structure and to the ratio of the elastic modulus of the vitreous fiber material to that of the lead alloy body or matrix. Incorporation of high modulus vitreous silica fibers, or other compatible high modulus fibers, into a ductile matrix of lead and lead alloy provides a structure in which the fibers absorb a substantial part of the tension or load per unit cross-sectional area of each part thereof. Continuous fibers are readily oriented along the load bearing axis of the plate structure and if care is taken to secure bonding of the fibers to the lead alloy matrix through the fiber coating, the strains resulting from various physical and chemical factors within a battery cell plate will tend to homogeneously distribute itself throughout the plate assembly and resemble a Hookean system. The possibilities of other like composite systems have been considered and for example, it has been found that woven composites, short fiber, bonded fiber interstices and connections as well as to the metallic matrix, employing various fiber geometries such as circular, ellipsoidal, square, rectangular, cross, star, and diamond, and variations and combinations thereof, can be useful in the practice of the instant invention.

Figure 2:
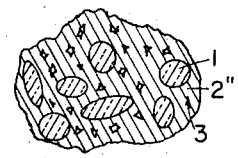
FIGURE 2 is a cross-sectional fragmentary view of the plate of the invention, corresponding to FIGURE 1.

Thus, as shown in FIGURE 1, fibers 1 of glass or vitreous silica may have lead coatings 2. Fibers may be laid together with axes in desired orientation as described hereinabove and hereafter, and with lead particles 2' filling the interstices between the coated fibers. After heat and pressure have been applied, as described herein, there is provided an article as shown in FIGURE 2 wherein glass fibers 1 are embedded and securely bonded in a matrix 2'' which comprises a substantially continuous phase of metal which previously constituted the fiber coating and the metal particles. Void 3 remain as desirable pores and bubbles or striae which may be discrete but are preferably interconnected, and desirably may function as effectively increasing the total available surface area of the battery plate structure. The voids result from the metal not fully filling the spaces or interstices which existed in the composite mass prior to application of heat and pressure, and the total amount of such voids is therefore capable of rather close control during the preparative process. Also employable for control and preparation of voids are heat decomposable gas-forming materials which effect expansion of the mass just prior to complete solidification of the matrix material, as particularly useful are compatible metal halides, carbonates, oxides, as well as organic gas formers, and others commonly employed in the plastic, ceramic and metal arts.

EXAMPLE I

Desirable results have been obtained by applying a pressure of 3500 p.s.i. at a temperature of 70° F. for a period of from 15 seconds to 2 minutes to a composite mass of coated fibers such as described above. The resultant sheets of reinforced lead alloy have fibers disposed substantially uniformly throughout the interior thereof but are characterized by lower mechanical strengths and resistances to physical degradation than are the products of other embodiments and invention examples. A particularly useful lead alloy composition may be an alloy comprising by weight 5% antimony, 0.5% tin, about 0.1% tellurium, the balance lead. Increasing the antimony content of the lead to 9% and adding about 1% silver produces a tensile strength increase. Varying the type of fibers employed from mat laminated to crosslaminated, as well as using a chopped fiber composite, with from 0% to 5% by volume of glass flakes in addition to the foregoing types, also affects the physicals of the resultant sheet. The chopped fiber composite shows a tensile strength about half that of the mat and cross laminated lead composite structure, while increasing the tensile strength of the unreinforced lead alloy several times. While the high lead content glass fibers appeared to give better bonded fiber coatings, the fused silica fibers are lighter and stronger. Increasing the fiber volume from 55% to 70% does not produce a proportional increase in sheet tensile strength but results in an increase of about 10%.

EXAMPLE II

The sheet prepared in accordance with Example I, but the temperature of preparation was increased to 200° C. and the pressure was reduced 250 p.s.i. for a period of about 2 minutes.

EXAMPLE III

The composite prepared in accordance with Example I may be laminated to a sheet of lead by pressing the lead sheet and a sheet of the example together between press platens at the same temperature and pressure for a period of 20 seconds to 5 minutes. A temperature of 150° C. with a pressure of 500 p.s.i. for the same time period may also be used for desirable results.

EXAMPLE IV

Fibers of E-glass having a diameter of 15 to 30 microns and a coating ½ to 3 microns thick of an alloy of lead with about 2% by weight antimony are laid out into a sheet having a thickness of about ½ inch with the axes of all fibers substantially parallel. The temperature of the sheet is raised to 150° C. The sheet is placed between flat press platens, each insulated with ½ inch thick layer of asbestos insulation. The press is closed to a pressure of 500 p.s.i. for a period of 5 minutes. The press is opened and the sheet which has been formed between the platens is removed and the sheet is found to possess greater mechanical strength than the product of Example I. Plates produced from this sheet are also capable of greater porosity control than those prepared in accordance with Example I and are hence superior.

EXAMPLE V

Plates are prepared as in Example IV excepting that a lead-silver alloy is employed as the coating for high lead content glass (Corning 8363) fibers. High coating-to-fiber bond strengths are achieved by this combination since a grading of composition from high to low lead material is made possible. The lead silver alloy is highly corrosion resistant to sulfuric acid corrosion and is therefore desirable despite its lower tensile values as compared to a lead-antimony alloy composite.

EXAMPLE VI

Plates are prepared as in the preceding example excepting that 30% by volume lead-silver alloy particles are added to the fibers in selected locations on the sheet through an appropriately designed lattice mold which is made part of the press platen. Upon application of pressure and heat there results a preformed battery grid lattice structure substantially ready for active material pasting and the formation process. Battery plate assemblies prepared by this example can be designed to have any number of coated fibers extending across the grid lattices which act as further supporters or the active material. These metallic coated vitreous fibers also act as current carriers through the active material and function as current shunts for the high resistivity lead peroxide positive plate active material. These lattice disposed lead alloy coated fibers making up a part of the grid structure, when prepared in accordance with this example, enable and assist in the preparation of high concentrations of the alpha modification of $PbO_2$ during electrode formation processes. High concentrations of this alpha form make possible an even superior battery plate in that its electron flow is higher than the beta modification of $PbO_2$ also produced during formation. The alpha form makes possible the prolonging of plate life since its discharge rate is lower, and it structurally provides a hard continuous network for the softer beta matrix to be retained. Overvoltage during formation is minimized due to fiber current paths provided by the metallic coated vitreous fibers throughout the grid openings as well as the grid body and spines of the tubular positive plate types. High overvoltages tend to promote higher beta forms of $PbO_2$ which are undesirable.

VARIABLES

Fiber composition

The composition of the fibers may be any appropriately compatible vitreous material. E-glass and vitreous silica are generally preferred because of the relatively high strength and relatively high temperature resistance of these materials. Also preferred is the high lead glass which gives high bond strengths with the lead alloy coating due to the graded lead contents from coating to fiber. Other products may be made with crown glass, high alumina vitreous materials, borosilicates, cullet and the like.

Fiber physical dimensions

Fibers are normally round or nearly round in cross-section but may also be ellipsoidal, warped, ovular, and kidney-shaped. Other desirable shapes include diamond, flat, square, star and cross shapes. The additional surface areas provided by the more sophisticated non-circular forms do not appear to influence the composite physicals to any significant degree even though some improvement is observed as to bonding of fiber coatings.

The diameter of the fibers may be suitably up to about 30 to 35 microns, and greater, with a maximum preferred diameter of about 23 to 26 microns. Excellent results may be obtained with fibers as small as 2 to 3 microns in diameter and it is believed that there is no lower limit to suitable diametrical size insofar as applicability to this invention is concerned. Therefore, the fibers of lowest diameter which can be practically produced or which may be commercially obtained are thought to be suitable.

Continuous fiber lengths are desirable since the strength of the plate assemblies of this invention depend largely upon the ability of the lead matrix area, the shear strength, the fiber to matrix bond, and the fiber continuity to support the applied loads thereon. Cloth and cross laminates as well as filament wound types and chopped mats in which the effective fiber length is greater than the product dimension are capable of more uniform load handling and are therefore desirable. In the case of randomly oriented chopped fibers less than the full fiber area is available for physical strengthening.

Introduction of a third phase into the fiber-matrix composite material provides a still further increase in physical strengths. The dispersion of a partly insoluble or insoluble particle to effect dispersion hardening as well as fiber hardening is deemed advantageous for certain highly reliable energy conversion system plate or electrode assemblies. High temperature operating characteristics are improved. Particles or glass flakes can be centrifugally or otherwise incorporated into the lead alloy material prior to lead particle preparation. These particle reinforced lead powders are then ready for employment as filler in the instant invention.

Coating dimensions

The fiber metallic coating may be as thin as $\frac{1}{10}$ micron and as thick as 3 microns. Portions may be as thin as $\frac{1}{100}$ micron in situations involving non-uniformly coated fibers. It is preferred that the coating covers all of the fiber and be relatively uniform in thickness but such uniformity is not necessary to obtain good results. Suitable results may be obtained with fibers in which as much as 20% of the surface of each fiber is not coated.

Use of high lead content vitreous materials, including glasses and ceramics, provides for more uniformly coated fibers and enhanced bonding between fiber and coating. This is believed due to greater molecular bonding resulting from the grading of composition. Small antimony additions may increase fiber wetting.

Particle size

Particles smaller than 10 microns are generally not preferred. Preferred particles are those which pass through a 90 mesh (Tyler) and do not pass through a 400 mesh screen. However, a suitable batch of particles may contain particles of unpreferred size. Use of particles is preferred over use of molten cast structures since corrosion resistance of the plates is improved thereby. Selection of lead alloy powder within the recited particle size range, rather than the use of slugs or bulk lead castings and the like, is definitely preferred. While the precise mechanism involved is not completely known, and could be due to the particular oxides formed on the individual particles, it has been observed that the particle size is important to the preparation of longer life lead acid battery plate assemblies. Exhibited is an increased resistance to pitting and other sulfuric acid corrosion action. Preparation of the composite may also be by roll bonding methods to effect metal-metal and metal-fiber, and if incorporated metal-particle bonds.

Proportions

It is preferred that metal and fiber together constitute approximately 85% or more of the completed battery plate, with the remainder of the structure being voids, pores, and the like, and may be discrete or interconnected. A particularly desirable plate is one in which the metal and fiber together constitute 90% to 98.5% of the plate volume with 10% to 1.5% of the total volume being occupied by cells or voids. Porosity of the plate only becomes critical when high discharge rates are envisioned since under normal conditions of current demands electrolyte activity is fairly uniform throughout the active plate portions even in rather dense composites.

Fibers suitably occupy from 50% to 78% of the metal-fiber total volume and preferably occupy from 65% to 75% of this volume. A substantial increase in functionality is realizable with even as little as 10% fiber especially in those applications where the high fiber content is undesirable but yet where its strength additions produce a superior result. The percentage of said metal which is supplied by powder may be greater or less than prescribed depending upon the thickness of the fiber coating. Prior to application of heat and pressure, metal powder may be added in amounts of from 5% to 50% by weight with respect to the weight of coated fibers employed. In the tab or lug part of the finished plate assembly it is understood that the total metal content will be greater than in other sections occupied by grid structure and active materials.

Pressure, temperature, time

If higher pressure is used, lower temperatures may also be used. Temperature may be suitably from 70° F. to 325° F. and preferably from 120° F. to 170° F. Pressure may be varied from 300 p.s.i. to 4,000 p.s.i. Suitable times of application of the pressure and temperature are from several seconds to about 30 minutes. Better results are usually obtained if pressure is applied for about a minute and preferred results obtained in the 3 minutes to 6 minutes time interval. The application of pressure beyond 10 minutes usually provides no substantial useful improvement.

Metal composition

The composition of the metal used for both coating and particles is preferably at least 87% by weight lead. In other types of wet battery energy conversion systems the metallic composition might be suitably nickel-iron, nickel-cadmium, silver-zinc, silver-cadmium, as well as the silver and copper chloride-magnesium types. In the case of the lead acid battery, it has been found that while the addition of small amounts of antimony into lead lowers slightly the electrical conductivity thereof, sharper lead alloy grid structures are produced thereby. Antimony up to 15% is beneficial, and in the range of 8% to 11% not only gives superior casting-pressing properties but also produces an increase in tensile strength and adds corrosion resistance. An alloy of 5% antimony with lead is suitable if a ductile matrix is desired.

Silver additions up to about 1% have been found useful and may be advantageously employed especially in preparing positive plates. While large amounts of calcium promotes undesirable plate growth during service, low cycling applications can suitably employ this type of composite cell material of lead-calcium. A particularly useful amount is about up to 0.1% calcium. Tin in amounts of up to 0.5% can be employed as an additional additive to lead and lead-antimony alloys of this invention.

Copper and arsenic should be avoided since they are, along with bismuth, harmful as corrosive action accelerators. The hardening effect of these elements to unalloyed lead is more than compensated for by the fiber hardening effected by the instant invention.

It is useful to use in the lead small amounts of tellurium or selenium, or both, in total amounts of up to about 0.25% by weight. Imparted to the lead alloy is better corrosion resistance and a finer grain lead alloy structure. Particularly desirable is an addition of about 0.1% tellurium.

It has been found that it is now possible to obtain a superior battery plate without use of antimony as a lead alloying element. Arsenic exclusion is thereby simplified with attendant cost savings. Furthermore, during gassing of the battery while under charge, the formation of poisonous stibine gas is avoided since no antimony is present. These improvements are possible since the losses in mechanical strength by not employing antimony can be compensated for in accordance with this invention. The imbedded fibers and other inherent attributes of the instant invention cooperate with each other and their surroundings and synergistically provide electrodes having tensile strengths far superior than have been heretofore possible. In the case of the lead acid battery alloy, one is provided with a structure having tensiles of the order of 20,000 p.s.i. and higher, which is several times greater than presently employed unreinforced commercial lead alloys.

By carefully matching and selecting the alloy composition in accordance with the desired parameters operable within the specific energy conversion system environment and to cooperate with the fiber phase it now becomes possible to greatly extend the functionality, life-times, applications, and serviceability of various energy conversion systems without additional cost. Of particular importance is the lead acid battery system but other systems are also contemplated including fuel cell electrodes where application of this invention can materially extend the lifetimes, serviceability, and functionality thereof, with only the specific selection of appropriate system assemblies and operating parameters well known in the art need be added hereto. It is observed that by practicing this invention lower production costs are realizable. Furthermore, weight savings are considerable since the resultant electrode assemblies and system components are exceedingly high strength-to-weight structures, and if weight saving is not important, thicker structures might be employable as desirable to give rise to enhanced conversion efficiencies.

A battery plate prepared in accordance with Examples IV and VI are installed into individual cells and a complete battery is constructed thereof. After considerable testing and after electrically draining and recharging the battery repeatedly, it is found that the plates of the invention are subject to less weight loss than conventional plates. Numerous other improvements in operating characteristics are observed.

Figure 3:
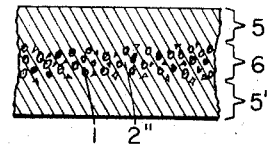
FIGURE 3 is a cross-sectional fragmentary view of a portion of a sheet which constitutes another invention embodiment.

In place of metal powder as described herein, there may be used one or more sheets or plates in the preparation of plates for battery use. It is generally preferred not to substitute such sheets for all of the weight of the powder, which is much preferred, but fairly good results are obtained when 20% of the weight of the powder is replaced with flat metal sheets of the same composition as the powder and as much as 50% of the weight of the powder may be replaced with such sheet-like assemblies or preformed lattice structures and tab attachments. A desirable article is also obtained by making a sheet of composite material as described herein wherein the metal of the matrix is provided entirely by fiber coatings and particles and then by laminating to one or both major surfaces of the resultant sheet, a sheet of lead to provide an article wherein, as shown in FIGURE 3, surface layers 5 and 5' are solid metal and the core layer 6 comprises fibers 1 and matrix 2".

It may thus be seen that the invention is broad in scope and includes such modifications as will be apparent to those skilled in the art, particularly after benefitting from the present teaching and the equivalents disclosed herein as specifically embraced within the invention, and it is to be understood that the invention is not limited to the specific embodiments thereof, excepting as defined in the appended claim.

Having thus described our invention, we claim:

The method of making a secondary battery plate comprising drawing siliceous fibers from a mass of molten siliceous material, coating said fibers with metal consisting of at least 87% lead while drawing them from said molten mass, forming masses of fibers into the form of a sheet, adding to said coated fibers from 12% to 33% by weight of said fibers of particles of metal consisting of at least 87% lead which pass a 90 mesh screen and do not pass a 400 mesh screen, heating the resultant mass to a temperature of from 120° C. to 170° C., applying a pressure of from 300 p.s.i. to 1200 p.s.i. to said mass while it is heated at said temperature and maintaining said pressure thereon for at least 30 seconds, then removing the article from the pressure and temperature applying means.

References Cited

UNITED STATES PATENTS

| | | | |
|---|---|---|---|
| 2,971,095 | 2/1961 | Drummond | 250—108 |
| 3,047,383 | 7/1962 | Slayter | 75—201 |
| 3,055,963 | 9/1962 | Kerbs | 136—51 |
| 3,145,090 | 7/1964 | Buckner | 65—18 |
| 3,260,576 | 7/1966 | Gruene et al. | 29—182.5 |

DONALL H. SYLVESTER, *Primary Examiner.*

R. L. LINDSAY, *Assistant Examiner.*